United States Patent
Turner

(10) Patent No.: US 6,402,458 B1
(45) Date of Patent: Jun. 11, 2002

(54) CLOCK TURBINE AIRFOIL COOLING

(75) Inventor: Mark Graham Turner, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 51 days.

(21) Appl. No.: 09/640,357

(22) Filed: Aug. 16, 2000

(51) Int. Cl.$^7$ .................................................. F01D 1/02
(52) U.S. Cl. ......................... 415/1; 415/193; 415/194; 415/195; 415/209.1
(58) Field of Search ........................... 415/1, 191, 193, 415/194, 199.5, 209.1, 211.2

(56) References Cited

U.S. PATENT DOCUMENTS 5,486,091 A    1/1996  Sharma
6,174,129 B1 * 1/2001  Mazzola et al. ............ 415/127

FOREIGN PATENT DOCUMENTS

AU    PA 2772       10/1970
JP    354114618 A * 9/1979

OTHER PUBLICATIONS

Adamczyk, "Workshop on Flow Modeling for Multistage Turbines," NASA, Sep. 20–21, 1994, 9 pages.

Gundy–Burlet, "Three–Dimensional Simulations of Hot Streak Clocking in a 1–1/2 Stage Turbine," Int'l J. of Turbo and Jet Engines, 1997, pp: 133–144.

Manwaring, "Unsteady Aerodynamics and Gust Response in Compressors and Turbines," J. of Turbomachinery, Oct. 1993, vol. 115, pp: 724–728.

* cited by examiner

Primary Examiner—Edward K. Look
Assistant Examiner—Ninh Nguyen
(74) Attorney, Agent, or Firm—William Scott Andes; Francis L. Conte

(57) ABSTRACT

A turbine includes three rows of airfoils which receive in sequence hot combustion gases during operation. The third row airfoils are clocked circumferentially relative to the first row airfoils for bathing the third row airfoils with relatively cool wakes discharged from the first row airfoils during the hottest running condition of the gas turbine engine being powered. The third row airfoils therefore avoid the hottest temperature of the combustion gases for reducing the cooling requirements thereof.

20 Claims, 4 Drawing Sheets

CLOCK TURBINE AIRFOIL COOLING

BACKGROUND OF THE INVENTION

The present invention relates generally to gas turbine engines, and, more specifically, to turbines therein.

In a gas turbine engine, air is pressurized in a compressor and mixed with fuel in a combustor for generating hot combustion gases which flow downstream through multiple turbine stages. A turbine stage includes a stationary turbine nozzle having stator vanes which guide the combustion gases through a downstream row of turbine rotor blades extending radially outwardly from a supporting disk which is powered by extracting energy from the gases.

A first stage, or high pressure, turbine nozzle first receives the hottest combustion gases from the combustor which are directed to the first stage rotor blades which extract energy therefrom. A second stage turbine nozzle is disposed immediately downstream from the first stage blades, and is followed in turn by a row of second stage turbine rotor blades which extract additional energy from the combustion gases.

As energy is extracted from the combustion gases, the temperature thereof is correspondingly reduced. However, since the gas temperature is relatively high, the high pressure turbine stages are typically cooled by channeling through the hollow vane and blade airfoils cooling air bled from the compressor. Since the cooling air is diverted from the combustor, the overall efficiency of the engine is correspondingly reduced. It is therefore desired to minimize the use of such cooling air for maximizing overall efficiency of the engine.

The amount of cooling air required is dependent on the temperature of the combustion gases. That temperature varies from idle operation of the engine to maximum power operation thereof. Since combustion gas temperature directly affects the maximum stress experienced in the vanes and blades, the cooling air requirement for the turbine stages must be effective for withstanding the maximum combustion gas temperature operation of the engine although that running condition occurs for a relatively short time during engine operation.

For example, a commercial aircraft gas turbine engine which powers an aircraft in flight for carrying passengers or cargo experiences its hottest running condition during aircraft takeoff. For a military aircraft engine application, the hottest running condition depends on the military mission, but typically occurs during takeoff with operation of an afterburner. And, for a land-based gas turbine engine which powers an electrical generator, the hottest running condition typically occurs during the hot day peak power condition.

The maximum combustion gas temperature therefore varies temporally over the operating or running condition of the engine. And, the maximum combustion gas temperature also varies spatially both circumferentially and radially as the gases are discharged from the outlet annulus of the combustor. This spatial temperature variation is typically represented by combustor pattern and profile factors which are conventionally known.

Accordingly, each turbine stage, either blades or vanes, is typically specifically designed for withstanding the maximum combustion gas temperature experienced both temporarily and spatially in the combustion gases disposed directly upstream therefrom. Since the airfoils in each row of vanes and blades are identical to each other, the cooling configurations therefor are also identical and are effective for providing suitable cooling at the maximum combustion gas temperatures experienced by the individual stages for maintaining the maximum airfoil stress, including thermal stress, within acceptable limits for ensuring a suitable useful life of the turbine stages.

Furthermore, as engines wear during normal use in operation, combustion gas temperature may be intentionally increased within limits for ensuring minimum rated power for the engine notwithstanding deterioration thereof. Normal engine deterioration over extended use decreases its efficiency and resulting output power, with a loss in output power being regained by increasing the temperature of the combustion gases.

Accordingly, the turbine cooling configurations must be additionally effective for acceptable cooling in worn engines up to the typical exhaust gas temperature (EGT) limit.

It is therefore desired to provide a gas turbine engine turbine having improved cooling of the airfoils thereof.

BRIEF SUMMARY OF THE INVENTION

A turbine includes three rows of airfoils which receive in sequence hot combustion gases during operation. The third row airfoils are clocked circumferentially relative to the first row airfoils for bathing the third row airfoils with relatively cool wakes discharged from the first row airfoils during the hottest running condition of the gas turbine engine being powered. The third row airfoils therefore avoid the hottest temperature of the combustion gases for reducing the cooling requirements thereof.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
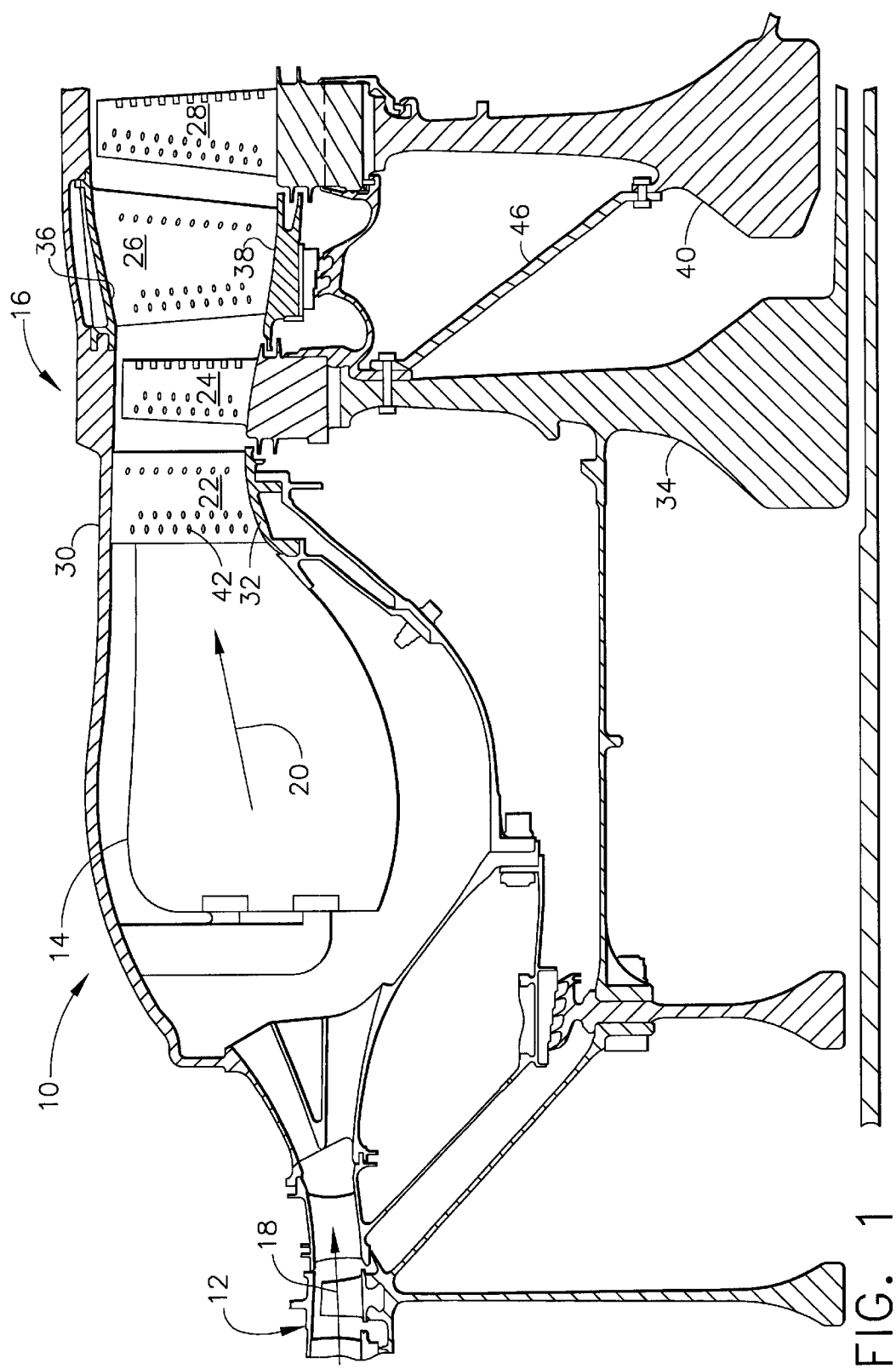
FIG. 1 is an axial sectional view through a portion of an exemplary aircraft gas turbine engine including a turbine in accordance with a preferred embodiment of the present invention.

Illustrated in FIG. 1 is a portion of a turbofan gas turbine engine 10 configured for powering an aircraft in flight. The engine is axisymmetrical about a longitudinal or axial centerline axis and includes in serial flow communication a fan (not shown), multistage axial compressor 12, shown in aft part, annular combustor 14, two-stage high pressure turbine 16, and a multistage low pressure turbine (not shown).

During operation, air 18 is pressurized in the compressor and mixed with fuel in the combustor for generating hot combustion gases 20 which flow downstream through the high and low pressure turbines which extract energy therefrom. The high pressure turbine powers the compressor, and the low pressure turbine powers the fan in a conventional configuration for propelling the aircraft in flight from takeoff, cruise, descent, and landing.

Figure 2:
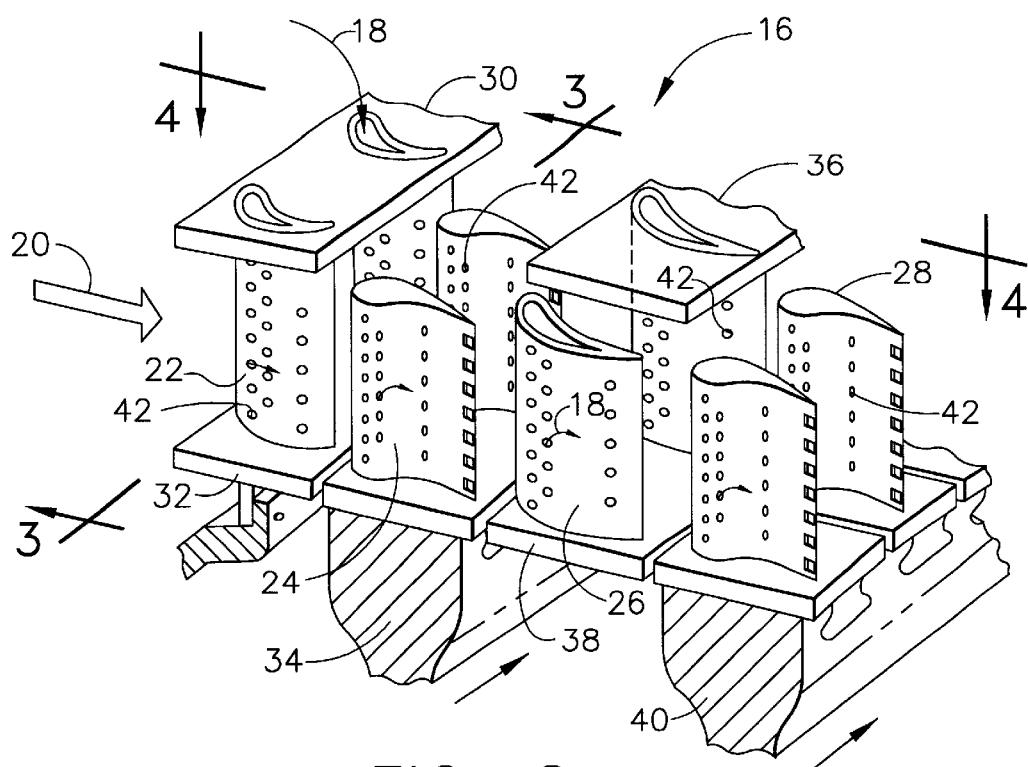
FIG. 2 is an isometric view of a portion of the two-stage high pressure turbine illustrated in FIG. 1.

As shown in FIGS. 1 and 2, the high pressure turbine 16 is configured in two stages having four rows of airfoils 22,24,26,28 disposed axially in direct sequence with each other for channeling the combustion gases 20 therethrough in turn and extracting energy therefrom.

The airfoils 22 are configured as first stage stator vanes circumferentially spaced apart from each other and extending radially between outer and inner bands 30,32 for first receiving the combustion gases 20 from the combustor.

The airfoils 24 extend radially outwardly from the perimeter of a first supporting disk 34, and are configured as first stage turbine rotor blades which receive the combustion gases from the first stage vane airfoils 22 for extracting energy to rotate the disk during operation.

The airfoils 26 are configured as second stage nozzle vanes extending radially between supporting outer and inner bands 36,38 and directly receive the combustion gases from the first stage blade airfoils 24.

And, the airfoils 28 extend radially outwardly from a second supporting disk 40, and are configured as second stage turbine rotor blades for directly receiving combustion gases from the second stage vane airfoils 26 for additionally extracting energy therefrom for rotating the disk 40.

Since the several turbine airfoils 22–28 are bathed in the hot combustion gases 20 during operation, they are typically cooled in a conventional manner. For example, the four rows of airfoils are hollow and may include various internal cooling features therein. A portion of the compressor air 18 is diverted from the compressor and used as cooling air channeled through the several airfoils for internal cooling thereof.

The four rows of airfoils typically also include various holes or apertures 42 extending through the opposite pressure and suction sidewalls thereof for discharging the spent cooling air into the combustion gas flowpath. The apertures may be configured in rows of conventional film cooling holes or trailing edge holes, and may be disposed in either or both sidewalls of each airfoil in any conventional manner.

In this way, the spent cooling air from inside each airfoil is discharged through the various apertures to provide protective films of cooling air on the external surfaces of the airfoils for additional protection from the hot combustion gases.

The engine 10 illustrated in FIG. 1 is configured in an exemplary embodiment as a turbofan aircraft engine for powering an aircraft in flight, and therefore operates at varying running conditions or power from idle, takeoff, cruise, descent, and landing. Accordingly, the maximum temperature of the combustion gases 20 generated during operation also varies temporally correspondingly with the various running conditions of the engine.

Furthermore, the spatial temperature distribution of the combustion gases 20 discharged from the combustor 14 during operation varies both circumferentially and radially as represented by the conventional profile and pattern factors.

Figure 3:
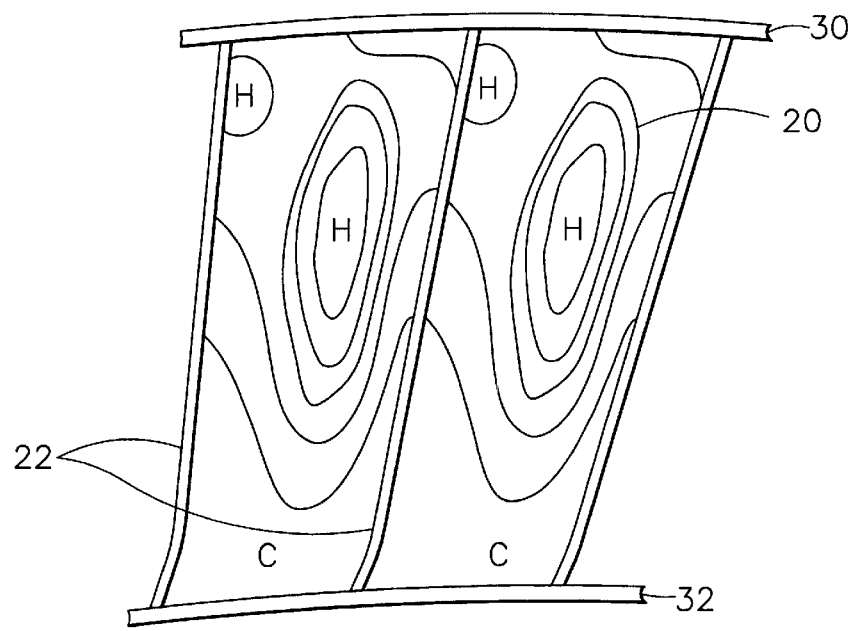
FIG. 3 is an end view of a portion of the first stage turbine nozzle illustrated in FIG. 2 and taken along line 3—3 showing exemplary total relative temperature profile of the combustion gases channeled therethrough.

The first stage vanes 22 illustrated in FIG. 2 are configured to channel the combustion gases between the downstream first stage blades 24 which extract energy therefrom. FIG. 3 illustrates an exemplary profile or distribution of the total relative temperature of the combustion gases 20 which varies both radially and circumferentially within each intervane passage. This exemplary temperature distribution may be analytically determined using modern three-dimensional (3-D) numerical computation equations in a conventional manner. FIG. 3 illustrates isoclines of the different temperatures of the combustion gases from relatively hot (H) to relatively cool (C).

Figure 4:
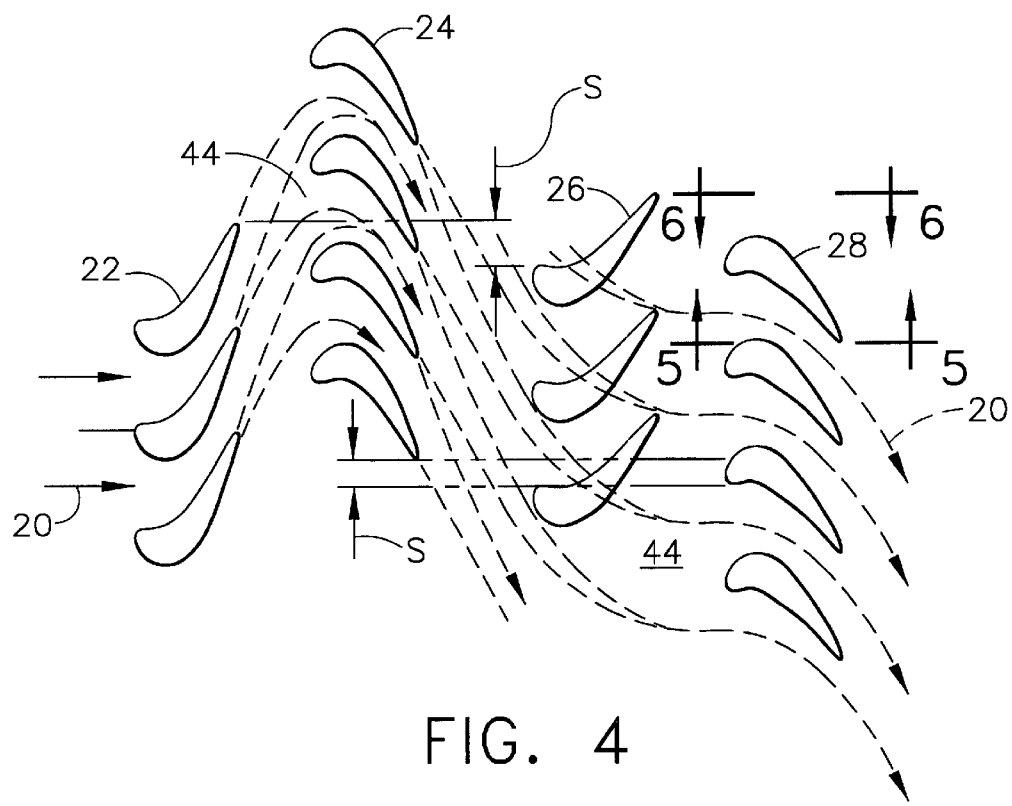
FIG. 4 is a top view of exemplary vane and blade airfoils of the two stage turbine illustrated in FIG. 2 and taken along line 4—4.

FIG. 4 illustrates schematically the axial flowpath of the combustion gases 20 as they travel from stage-to-stage over the four rows of airfoils 22–28. Since the combustion gases 20 necessarily flow between the airfoils in each stage, the individual airfoils themselves circumferentially interrupt the combustion gas flow and therefore effect corresponding wakes 44 from the respective trailing edges of the individual airfoils.

The wakes 44 are local interruptions in the continuity of the main combustion gas flow in which local turbulence is generated. And, the wakes have a distinguishable lower momentum than the combustion gas flow between adjacent airfoils. For a turbine, the wakes 44 are cooler than the surrounding combustion gas flow for the following two reasons.

Fundamentally, the turbine is extracting energy from the combustion gases which lowers the average temperature thereof. The downstream vane and blade airfoils act on the lower momentum wake fluid from the airfoils immediately upstream therefrom to a greater extent than the surrounding combustion gas, and therefore reduce the temperature of the combustion gas wakes themselves. This occurs in both the high pressure turbine illustrated in FIG. 2, as well as in the low pressure turbine, not illustrated.

For the high pressure turbine illustrated in FIG. 2, the individual airfoils are provided with internal cooling, with the spent cooling air 18 being discharged through the various apertures 42 into the combustion flowpath. The spent cooling air thusly flows along the outer surfaces of the airfoils and is discharged from the trailing edge thereof directly into the forming wakes 44. The wakes are therefore additionally cooled by the introduction of the spent cooling air therein.

This performance is used in accordance with the present invention for reducing the temperature of the turbine rotor blades or nozzle vanes by bathing them with the relatively cool wakes from the corresponding upstream airfoil row which is in the same relative frame of motion as the blade or vane row. For nozzles, an upstream nozzle is circumferentially aligned or clocked with a corresponding downstream nozzle with an intervening row of rotor blades. For rotors, an upstream blade row is circumferentially aligned or clocked with a corresponding downstream blade row, with an intervening nozzle therebetween.

Figures 5, 6:
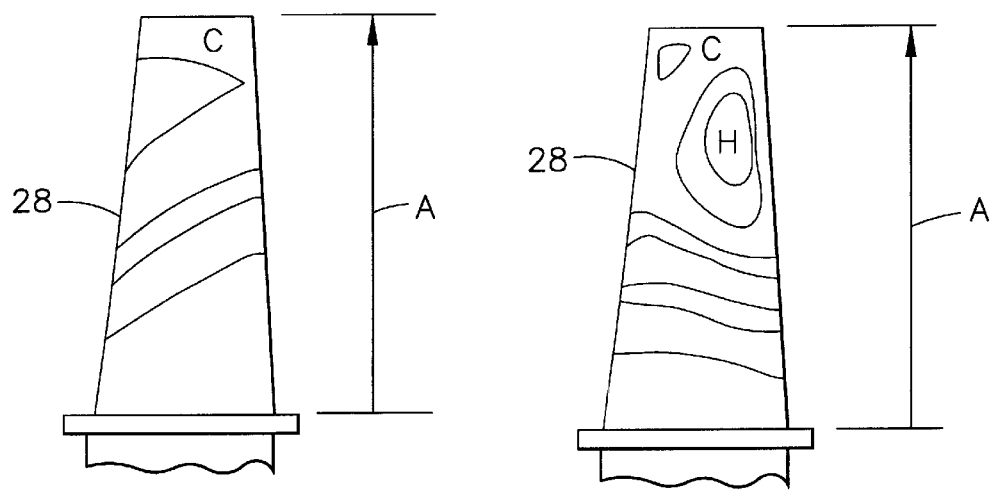
FIG. 5 is a pressure-side view of a rotor blade illustrated in FIG. 4 and taken along line 5—5 showing an exemplary total relative temperature distribution thereon.
FIG. 6 is a suction-side view of the rotor blade illustrated in FIG. 4 and taken along line 6—6 showing the total relative temperature distribution thereon.

In this way, the relatively cool wakes 44 illustrated in FIG. 4 may be used for preferentially bathing the corresponding downstream row of airfoils for reducing the temperatures experienced thereby as illustrated for example in FIGS. 5 and 6.

FIG. 5 illustrates the profile or distribution of the total relative temperature on the pressure side of the second stage blade 28 illustrated in FIG. 4, with FIG. 6 illustrating the corresponding total relative temperature distribution on the suction side thereof. The isoclines of temperature distribution vary from relatively cool (C) to relatively warm or hot (H).

By suitably clocking the corresponding rows of rotor blades or nozzle vanes, the cool wakes 44 may be confined to bath the corresponding downstream row of airfoils for reducing the temperature experience thereby and the resulting stresses experienced during operation.

Figure 7:
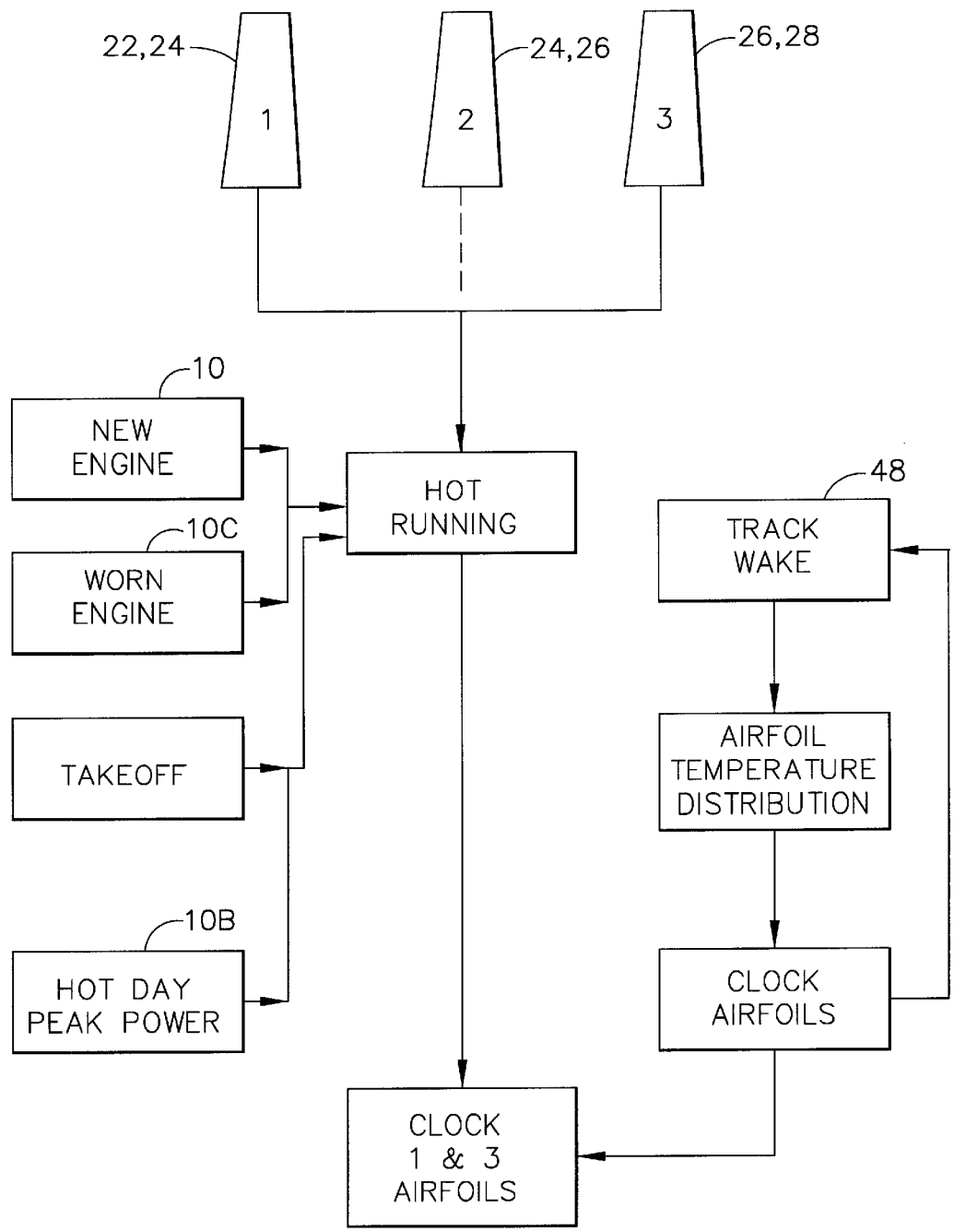
FIG. 7 is a flowchart method of cooling a third airfoil row in accordance with a preferred embodiment of the present invention.

FIG. 7 illustrates in flowchart form an exemplary method of cooling the high pressure turbine 16 illustrated in FIGS. 1 and 2 in accordance with a preferred embodiment of the present invention. Since the invention may be practiced for turbine blades or nozzle vanes in the same relative frame of motion, the flowchart is presented generally in cooperation with the exemplary turbine configuration illustrated in FIG. 4 for representing both basic configurations.

For the turbine nozzle application, three sequential rows of turbine airfoils include the first stage vanes 22 and blades 24, and the second stage vanes 26.

And, for the turbine rotor application, the three sequential rows of turbine airfoils include the first stage turbine blades 24 and the second stage vanes 26 and blades 28.

In both applications, the third row of turbine airfoils, vanes 26 or blades 28, are cooled by preferential circumferential clocking with the corresponding first row airfoils, first stage vanes 22 or first stage blades 24, with an intervening row of airfoils therebetween. The cooling method is practiced by initially selecting the hottest running condition of the engine for producing the hottest temperature combustion gases therein which flow in sequence through the three rows of airfoils. And, the third row airfoils, such as the second stage blades 28, are correspondingly circumferentially aligned or clocked relative to the corresponding first row airfoils, such as the first stage blades 24, for bathing the third row airfoils with the relatively cool wakes 44 discharged from the first row airfoils for cooling the third row airfoils. The blade count for the upstream first row should be the same as the downstream third row, or an integral ratio thereof for correspondingly aligning the trailing edges of the upstream row relative to the leading edges of the downstream row in the same circumferential orientation.

As shown in FIG. 4, the individual rows of airfoils are circumferentially spaced apart from each other in each row with an equal spacing represented by the pitch from airfoil-to-airfoil in each row. The circumferential pitch is the same from the leading to trailing edges of the airfoils. The circumferential clocking between the corresponding airfoil rows is represented by the circumferential spacing S from the trailing edge of the upstream airfoils relative to the leading edge of the downstream airfoils. This clocking or spacing S may be represented by the percentage of the downstream airfoil pitch, with zero percent and 100% indicating no circumferential spacing between the corresponding trailing and leading edges, and a 50% pitch spacing indicating the trailing edge of the upstream airfoil being aligned circumferentially midway between the leading edges of the downstream airfoils.

For the first and second rotor stages illustrated in FIG. 1, circumferential clocking therebetween is effected by corresponding indexing of the bolt holes and retention bolts in the connecting shaft 46 therebetween. For the two nozzle stages illustrated in FIG. 1, the corresponding circumferential indexing therebetween is effected by the circumferential positioning of the second stage vanes 26 in their supporting casing relative to the first stage vanes 22. Any conventional form of disk-to-disk or vane-to-vane attachment may be used for suitably clocking the airfoils, including, for another example, spline joining of rotor disks.

Since the combustion gases channeled through the various turbine stages heat the corresponding airfoils, the airfoils are subject to thermally induced stress due to the variations in temperature distribution thereover. This thermal stress is in addition to stress from the pressure loads acting on the airfoils, and in addition to centrifugal forces as the rotor blades rotate during operation.

Accordingly, the first and third row airfoils, such as 24,28 or 22,26, are preferably also clocked at the hottest running condition to reduce stress in the third row airfoils subject to thermal stress from the combustion gases. The third row airfoils may therefore not only be cooled by being bathed with the cool wakes during the hottest running condition, but the clocking may also be used to preferentially cool those airfoils and reduce thermal gradients therein to reduce stress as desired in the airfoils.

FIG. 7 illustrates an exemplary method for determining the desired clocking of the airfoil rows in the original design of the turbine. The clocking may be determined by analytically tracking the cool wakes 44 from the first row of airfoils to the third row. This may be accomplished in a digitally programmable computer 48 having suitable three-dimensional computational software for performing the sophisticated flow field analysis of the combustion gases channeled in turn through the relevant turbine stages. These analytical analyses may include unsteady analysis, mean-flow weight tracking, or average passage approach which are conventionally known.

The third row airfoils may then be analytically clocked at an initial position for evaluating corresponding surface temperature distributions on the opposite sides thereof. FIGS. 5 and 6 illustrate an exemplary distribution of total relative temperature on the opposite two sides of the second stage blades 28 due to the relatively cool wakes and relatively hot combustion gases. This temperature distribution may be analytically determined using conventional 3-D Navier-Stokes computational analysis. This analytical process is repeated for a plurality of different clocking positions between the first and third airfoil rows to cover the full range of clocking positions from zero percent to 100% airfoil pitch alignment. The objective of the analytical evaluation of the turbine stages is to position the downstream airfoil row for avoiding the hot spot of combustion gases being discharged from the upstream inter-airfoil passage, such as the nozzle illustrated in FIG. 3.

The variously analyzed different clocking positions between the first and third row airfoils may be used for evaluating the temperature profiles produced on the third row airfoils.

The preferred clocking of the two rows of turbine blades 24,28 is effected by calculating the relative total temperature of the wakes that are analytically tracked between the rotors which are stationary relative to each other as they rotate. The cool wakes 44 are shed from the trailing edges of the upstream rotor blades 24 and then turned by the second stage nozzle vanes 26 which are stationary in the absolute frame, but moving relative to the turbine blades.

The relative total temperature is reduced as the gases are turned by the nozzle vanes, and the wake fluid temperature is reduced even more. The actual physics though the second stage nozzle vanes 26 is unsteady, with the wake being chopped and distorted. But, in the frame of reference of the rotor blade, the time averaged effect is to turn the wakes 46 as illustrated in dashed line in FIG. 4 which diverge in a downstream direction as they flow to the second stage blades 28.

Substantially the same analytical procedure is used for clocking the first and second stage nozzle vanes 22,26 relative to each other, except that the absolute total temperature rather than the relative total temperature is determined as the corresponding wakes are analytically tracked. As indicated above, the first row airfoils, e.g. 22 or 24, are hollow for channeling the cooling air 18 therethrough. They also include the outlet apertures 42 for discharging the cooling air into the corresponding wakes 44 during the hottest running condition.

In this way, the corresponding wakes 44 are additionally cooled by the introduction of the spent cooling air 18 discharged from the upstream row airfoils which further reduces the cooling effect of the wakes on the downstream row of airfoils.

FIGS. 5 and 6 illustrate one of several temperature distributions corresponding with a particular clocking of the first and third row airfoils. This clocking is at about 40% pitch of the downstream, third row airfoils, e.g. the second stage blades 28, in which the first and third row airfoils 24,28 are specifically clocked to locally cool the third row airfoils 28 at a predetermined spot on the external surface thereof, such as at the radially outer tip.

The complexity of the temperature isoclines illustrated in FIGS. 5 and 6 varies as the clocking positions vary, with the cooling affect of the wakes 44 also varying. Accordingly, the first and third row airfoils may alternatively be clocked to locally cool the third row airfoils 28 at a predetermined height A along a radial span thereof. The span location may be near the blade tips, if desired, or may be at any other span location within the capability of the cool wakes to cool.

Alternatively, the first and third row airfoils 24,28 may be clocked to cool the third row airfoils 28 for reducing the average temperature thereof, instead of a local spot temperature only.

It is conventionally known that first and third row turbine rotor blades may be clocked near zero percent pitch for maximizing turbine efficiency, with minimum turbine efficiency being effected at a clocking position of about 50% pitch. However, clocking to maximize turbine efficiency is effected at the longest duration running condition of the engine, such as cruise operation in an aircraft engine, for maximizing overall efficiency. In contrast, the first and third row airfoils as described above are clocked in accordance with the present invention at the hottest running condition which typically is relatively short in duration, and corresponds with takeoff power operation for an aircraft gas turbine engine. Significant cooling of the downstream third row airfoils may be obtained by specifically clocking the first and third airfoil rows, which typically corresponds with achieving less than the maximum turbine efficiency at the hottest running condition. Accordingly, efficiency may be sacrificed during takeoff for the substantial advantage of cooling downstream row airfoils for improving their durability and life.

The hottest running condition for a typical military gas turbine engine occurs during takeoff power with afterburner operation. The first and third row airfoils may therefore be clocked at this condition for the military engine for providing enhanced cooling of the third row airfoils.

The takeoff running condition is illustrated schematically in FIG. 7 in one embodiment of the invention for a new engine 10, for example. For a land-based gas turbine engine 10B having components comparable to those of the aircraft engine 10 illustrated in FIG. 1, the hottest running condition is the hot day peak power for the engine when used in driving an electrical generator associated therewith.

A particular advantage of the present invention is that it may be used for also improving airfoil cooling in a worn engine 10C having been used in service for a substantial portion of its expected life, typically represented by thousands of hours. As an engine wears, its performance deteriorates, and the engine must therefore be operated with higher combustion gas temperature than normally found in the new engine for producing additional power for ensuring minimum rated power output of the engine. The hotter combustion gases therefore subject the turbine airfoils in the worn engine to greater heat input than in the new condition.

Furthermore, deterioration of the turbine correspondingly changes the flowpath of the combustion gases therethrough. The present invention may therefore be used for originally clocking the first and third row airfoils associated with the hottest running condition in the worn engine which is different than in the engine when new.

In this way, as the engine wears during its useful life, the flowpath of the cool wakes will also vary to preferentially cool the downstream row airfoils to reduce the temperature thereof which would otherwise occur as the combustion gas temperature is increased for compensating performance loss of the engine.

Accordingly, the cooling benefits of bathing the downstream row airfoils with the cool wakes 44 may be delayed during the life of the engine for maximizing cooling affect as the engine otherwise deteriorates for ensuring effective cooling at the minimum rated power of the engine despite the increase in combustion gas temperature required therefor.

By utilizing the present invention, the downstream row airfoils subject to relatively cool wakes from upstream row airfoils may now be designed not to the maximum temperature of combustion gases flowing thereover, but to the lower temperature attributable to the preferentially aligned cooling wakes. Enhanced cooling of the airfoils may be obtained with the same amount of cooling airflow therethrough. Or, the cooling airflow requirements may be reduced for further increasing efficiency of the engine.

In the latter embodiment, the engine efficiency increase due to using less cooling air may be used for offsetting any decrease in turbine efficiency attributable to clocking the two airfoil rows away from the nominal pitch clocking thereof. And, since the clocking is effected at the hottest running condition of the engine, that condition is typically of short duration, and, correspondingly, any decrease of operation efficiency is correspondingly of small duration.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A method for cooling a third row of turbine airfoils following in sequence first and second rows of turbine airfoils in a gas turbine engine, comprising:

selecting the hottest running condition of said engine for producing the hottest temperature combustion gases which flow in sequence through said three rows; and clocking said third row airfoils circumferentially relative to said first row airfoils at said running condition for bathing said third row airfoils with wakes discharged from said first row airfoils for cooling said third row airfoils.

2. A method according to claim 1 wherein said first and third row airfoils are clocked to also reduce stress in said third row airfoils subject to thermal stress from said combustion gases.

3. A method according to claim 2 wherein said clocking is determined by:
   analytically tracking said wakes from said first row to said third row;
   analytically determining surface temperature distribution of said wakes on said third row airfoils; and
   analytically clocking said third row airfoils at a plurality of different positions for evaluating corresponding surface temperature distributions thereof analytically determined.

4. A method according to claim 3 wherein relative total temperature of said wakes is analytically tracked.

5. A method according to claim 3 wherein absolute total temperature of said wakes is analytically tracked.

6. A method according to claim 2 further comprising:
   channeling cooling air through said first row airfoils for internal cooling thereof; and
   discharging said cooling air from said first row airfoils into said wakes for reducing temperature thereof.

7. A method according to claim 2 wherein said first and third row airfoils are rotor blades, and said second row airfoils are stator nozzle vanes.

8. A method according to claim 2 wherein said first and third row airfoils are stator nozzle vanes, and said second row airfoils are rotor blades.

9. A method according to claim 2 wherein said first and third row airfoils are clocked to locally cool said third row airfoils at a predetermined spot on the external surface thereof.

10. A method according to claim 2 wherein said first and third row airfoils are clocked to locally cool said third row airfoils at a predetermined height along a radial span thereof.

11. A method according to claim 2 wherein said first and third row airfoils are clocked to cool said third row airfoils in average temperature.

12. A method according to claim 2 wherein said first and third row airfoils are clocked for achieving less than maximum efficiency in said hottest running condition.

13. A method according to claim 2 wherein said hottest running condition is takeoff power for an aircraft engine.

14. A method according to claim 2 wherein said hottest running condition is hot day peak power for an electrical power generation engine.

15. A method according to claim 2 wherein said hottest running condition occurs in a worn engine, and is different than in said engine when new.

16. A turbine for a gas turbine engine, comprising:
   first, second, and third rows of turbine airfoils for channeling combustion gases therethrough in sequence; and
   said third row airfoils are circumferentially clocked relative to said first row airfoils for bathing said third row airfoils with wakes discharged from said first row airfoils during a hottest running condition of said engine producing the hottest temperature of said combustion gases for cooling said third row airfoils.

17. A turbine according to claim 16 wherein said first row airfoils are hollow for channeling cooling air therethrough, and include a plurality of apertures for discharging said cooling air into said wakes during said hottest running condition.

18. A turbine according to claim 17 wherein said first and third row airfoils are clocked to also reduce stress in said third row airfoils subject to thermal stress from said combustion gases.

19. A turbine according to claim 18 wherein said first and third row airfoils are rotor blades, and said second row airfoils are stator nozzle vanes.

20. A turbine according to claim 18 wherein said first and third row airfoils are stator nozzle vanes, and said second row airfoils are rotor blades.

* * * * *